(12) United States Patent
Kakishima et al.

(10) Patent No.: US 10,652,048 B2
(45) Date of Patent: May 12, 2020

(54) 3-D MIMO COMMUNICATION SYSTEM, RADIO BASE STATION, AND USER EQUIPMENT

(71) Applicant: NTT DOCOMO, INC., Tokyo (JP)

(72) Inventors: Yuichi Kakishima, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/190,881

(22) Filed: Nov. 14, 2018

(65) Prior Publication Data

US 2019/0103994 A1    Apr. 4, 2019

Related U.S. Application Data

(63) Continuation of application No. 14/781,763, filed as application No. PCT/JP2014/055294 on Mar. 3, 2014, now abandoned.

(30) Foreign Application Priority Data

Apr. 5, 2013   (JP) .................................. 2013-079277

(51) Int. Cl.
*H04L 25/02*    (2006.01)
*H04B 7/0413*   (2017.01)
(Continued)

(52) U.S. Cl.
CPC ....... *H04L 25/0202* (2013.01); *H04B 7/0413* (2013.01); *H04B 7/0469* (2013.01);
(Continued)

(58) Field of Classification Search
CPC .. H04B 7/0413; H04B 7/0469; H04B 7/0478; H04B 7/063; H04B 7/065; H04B 7/0641;
(Continued)

(56) References Cited

U.S. PATENT DOCUMENTS 7,002,939 B1 *  2/2006  Hiramatsu ............... H04B 7/06
                                                  370/335
8,737,257 B2    5/2014  Seo et al.
(Continued)

FOREIGN PATENT DOCUMENTS

EP        2950458 A1    12/2015
WO    2012/057579 A2    5/2012
(Continued)

OTHER PUBLICATIONS

International Search Report issued in corresponding application No. PCT/JP2014/055294 dated Apr. 15, 2014 (4 pages).
(Continued)

*Primary Examiner* — Jenee Holland
(74) *Attorney, Agent, or Firm* — Osha Liang LLP (57) ABSTRACT

A user equipment is disclosed that includes a receiver configured to receive candidates of phase rotation in a horizontal direction and candidates of phase rotation in a vertical direction for precoding. The user equipment also has a processor configured to report feedback information including a phase rotation in the horizontal direction and a phase rotation in the vertical direction to a radio base station based upon the candidates of the phase rotation in a horizontal direction and the candidates of phase rotation in a vertical direction. Additionally, the candidates of phase rotation in the horizontal direction or the candidates of phase rotation in the vertical direction are a part of predetermined candidates, the part being selected from the predetermined candidates according to a predetermined method.

1 Claim, 9 Drawing Sheets

(51) Int. Cl.
*H04B 7/06* (2006.01)
*H04W 72/04* (2009.01)
*H04B 7/0456* (2017.01)
*H04B 7/10* (2017.01)
*H04B 17/391* (2015.01)
*H04L 5/00* (2006.01)

(52) U.S. Cl.
CPC ........... *H04B 7/0478* (2013.01); *H04B 7/063* (2013.01); *H04B 7/065* (2013.01); *H04B 7/0626* (2013.01); *H04B 17/391* (2015.01); *H04L 5/0053* (2013.01); *H04W 72/04* (2013.01); *H04B 7/0641* (2013.01); *H04B 7/10* (2013.01)

(58) Field of Classification Search
CPC ..... H04B 7/10; H04B 17/391; H04L 25/0202; H04L 5/0053; H04W 72/04
See application file for complete search history.

(56) References Cited

U.S. PATENT DOCUMENTS

| | | | |
|---|---|---|---|
| 9,042,262 | B2 | 5/2015 | Seo et al. |
| 2004/0001554 | A1 | 1/2004 | Sun et al. |
| 2004/0151265 | A1 | 8/2004 | Fisher et al. |
| 2004/0221025 | A1 | 11/2004 | Johnson et al. |
| 2005/0058151 | A1 | 3/2005 | Yeh |
| 2005/0070333 | A1 | 3/2005 | Doi |
| 2005/0101276 | A1 | 5/2005 | Nakao et al. |
| 2005/0141408 | A1 | 6/2005 | Anvari |
| 2006/0136169 | A1* | 6/2006 | Shonai .................. G01D 3/022 702/145 |
| 2007/0110092 | A1 | 5/2007 | Kangude et al. |
| 2007/0127586 | A1 | 6/2007 | Hafeez |
| 2007/0206700 | A1 | 9/2007 | Chang et al. |
| 2007/0224942 | A1 | 9/2007 | Kuramoto et al. |
| 2009/0227260 | A1 | 9/2009 | Anreddy et al. |
| 2010/0001904 | A1 | 1/2010 | Iwamatsu |
| 2010/0165930 | A1 | 7/2010 | Zangi |
| 2011/0080969 | A1 | 4/2011 | Jongren et al. |
| 2011/0103504 | A1 | 5/2011 | Ma |
| 2011/0117926 | A1 | 5/2011 | Hwang et al. |
| 2011/0150052 | A1 | 6/2011 | Erell et al. |
| 2011/0169436 | A1* | 7/2011 | Takahashi ............. H02P 23/14 318/400.3 |
| 2011/0199263 | A1* | 8/2011 | Kang ..................... G01S 3/04 342/442 |
| 2011/0305171 | A1 | 12/2011 | Matsuura et al. |
| 2012/0015603 | A1 | 1/2012 | Proctor, Jr. et al. |
| 2012/0170627 | A1 | 7/2012 | Koike et al. |
| 2013/0051364 | A1 | 2/2013 | Seol et al. |
| 2013/0258964 | A1 | 10/2013 | Nam et al. |
| 2013/0336152 | A1 | 12/2013 | Zhu et al. |
| 2014/0286464 | A1 | 9/2014 | Taghavi Nasrabadi et al. |
| 2015/0341091 | A1 | 11/2015 | Park et al. |

FOREIGN PATENT DOCUMENTS

| | | |
|---|---|---|
| WO | 2013/024350 A2 | 2/2013 |
| WO | 2013/024351 A1 | 2/2013 |
| WO | 2013144361 A1 | 10/2013 |

OTHER PUBLICATIONS

Written Opinion issued in corresponding application No. PCT/JP2014/055294 dated Apr. 15, 2014 (4 pages).
Alcatel-Lucent Shanghai Bell, Alcatel-Lucent, "Considerations on CSI feedback enhancements for high-priority antenna configurations"; 3GPP TSG-RAN WG1 Meeting #66, R1-112420, Athens, Greece, Aug. 22-26, 2011 (7 pages).
3GPP TSG Ran#58, RP-121994, "Study on Downlink Enhancements for Elevation Beamforming for LTE" (5 pages).
Samsung, "New SID Proposal: Study on Full Dimension MIMO for LTE"; 3GPP TSG RAN Meeting #58, RP-122015; Barcelona, Spain, Dec. 4-7, 2012 (6 pages) (document titled as RP-121804).
3GPP TSG RAN WG1 Meeting #62, R1-105011, "Way Forward on 8Tx Codebook for Rel.10 DL MIMO"; Madrid, Spain, Aug. 23-27, 2010 (6 pages).
Japanese Office Action of Japanese Application No. 2013-079227 dated Aug. 18, 2015 with English Translation thereof (8 pages).
Alcatel-Lucent Shanghai Bell, Alcatel-Lucent; "Considerations on CSI feedback enhancements for high-priority antenna configurations"; 3GPP TSG-RAN WG1 #66 R1-112420; Athens, Greece, Aug. 22-26, 2011 (7 pages).
Extended European Search Report in counterport European Patent Application No. 14778403.7, dated Feb. 2, 2016 (10 pages).
Office Action issued in the counterpart European Patent Application No. 14778403.7, dated Nov. 23, 2016 (5 pages).
Extended European Search Report issued in the counterpart European Patent Application No. 17162534.6, dated May 19, 2017 (10 pages).

* cited by examiner

$$W = \begin{bmatrix} e^{j0\theta_3}Y & e^{j1\theta_3}Y & \ldots & e^{jn\theta_3}Y \end{bmatrix}^T$$

$$Y = \begin{bmatrix} X \\ e^{j\theta_2}X \end{bmatrix}$$

$$X = \begin{bmatrix} e^{j0\theta_1} & e^{j1\theta_1} & \ldots & e^{jm\theta_1} \end{bmatrix}^T$$

3-D MIMO COMMUNICATION SYSTEM, RADIO BASE STATION, AND USER EQUIPMENT

CROSS-REFERENCE TO RELATED APPLICATIONS

This application is a continuation of U.S. patent application Ser. No. 14/781,763, filed Oct. 1, 2015, which is a national phase application of PCT/JP2014/055294, filed Mar. 3, 2014, which claims priority to Japanese Application JP2013-079277, filed Apr. 5, 2013. The contents of the priority applications are incorporated herein by reference in their entirety.

TECHNICAL FIELD

The present invention relates to a radio communication technology, and more particularly, to a three-dimensional multiple input, multiple output (3D-MIMO) radio communication system, a radio base station apparatus, and user equipment.

BACKGROUND ART

Long term evolution standardization in Third Generation Partnership Project (which may be referred to as "3GPP LTE") Release 8 to Release 11 have adopted horizontal beamforming using linear array antenna elements arranged in the lateral dimension.

In 3GPP LTE Release 12, a 3D-MIMO beamforming scheme that uses a number of antenna elements arranged two-dimensionally in the vertical and the lateral directions is being discussed. This new technology allows a base station to perform vertical beamforming in addition to horizontal beamforming. See, for example, non-Patent documents 1 and 2 listed below. By providing directionality in both the vertical (or elevation) and the horizontal (or azimuth) directions, improvement of system characteristics is expected.

Up to the 3GPP LTE Release 11, closed loop MIMO precoding has been achieved by returning channel state information (CSI) in the horizontal direction and between polarized antenna elements back to a MIMO base station. In order to reduce the CSI overhead, a codebook describing a set of precoding matrices (linear filters) is shared between the base station and user equipment. The user equipment selects a desired precoding matrix from the codebook and reports the selected matrix index together with the channel quality indicator (CQI) to the base station. The base station applies the precoding matrix to transmission data based upon the feedback information supplied from the user equipment.

For downlink MIMO transmission, codebooks designed for 8 transmit antennas have come to agreement. See, for example, non-patent Document 3 listed below.

LIST OF PRIOR ART DOCUMENTS

Document 1: "Study on Downlink Enhancement for Elevation Beamforming for LTE," 3GPP TSG RAN #58, RP-121994
Document 2: "New SID proposal: Study on Full Dimension for LTE," 3GPP TSG RAN #58, RP-122015
Document 3: "Way Forward on 8Tx Codebook for Rel. 10 DL MIMO," 3GPP TSG RAN WG1 Meeting #62, R1-105011

SUMMARY OF THE INVENTION

Technical Problem to be Solved

In 3D-MIMO, the transmission side needs to acquire channel information in the vertical direction (which may be referred to as "horizontal channel information), in addition to channel information in the horizontal direction (which may be referred to as "vertical channel information") and channel information between polarized antenna elements (which may be referred to as "inter-polarization channel information"). One of the important issues is how to reduce the overhead in transmitting reference signals (RSs) and feedback (FD) information.

For full-dimension MIMO (FD-MIMO) using antennas more than 8, it is forecast that the number of antenna elements will be several tens to a hundred or more. It is strongly desired to realize an efficient way of transmitting and receiving necessary information for beamforming.

One of the objectives of the invention is to reduce at least one of transmission overhead of reference signals and transmission overhead of feedback information.

Means for Solving the Problem

To achieve the above-described objective, the following techniques may be conceived.
(a) Reducing the RS overhead at a sender side by controlling configuration of RS transmission systems, such as selection of antenna elements used for RS transmission or RS transmission timing.
(b) Creating feedback information which includes vertical channel information in an efficient manner.

In this context, "configuration" of RS transmission systems includes configuration control information specifying a multiplexing position of a reference signal in terms of time and/or frequency, a reference signal transmission period, a combination of antenna elements and/or a transmission sequence used for RS transmission, etc.

In one aspect of the invention, a radio communication system includes
  a radio base station having multiple antenna elements arranged two-dimensionally; and
  a user equipment configured to perform radio communication with the radio base station,
  wherein the radio base station is configured to transmit a reference signal used for channel estimation in two or more different configurations using a part or all of the antenna elements, and
  wherein the user equipment is configured to feedback at least one of horizontal channel information, vertical channel information, and inter-polarization channel information to the radio base station.

Advantageous Effect of the Invention

At least one of reference signal transmission overhead and feedback information transmission overhead can be reduced in a 3D-MIMO radio communication system.

EMBODIMENTS TO CARRY OUT THE INVENTION

Figure 1A:
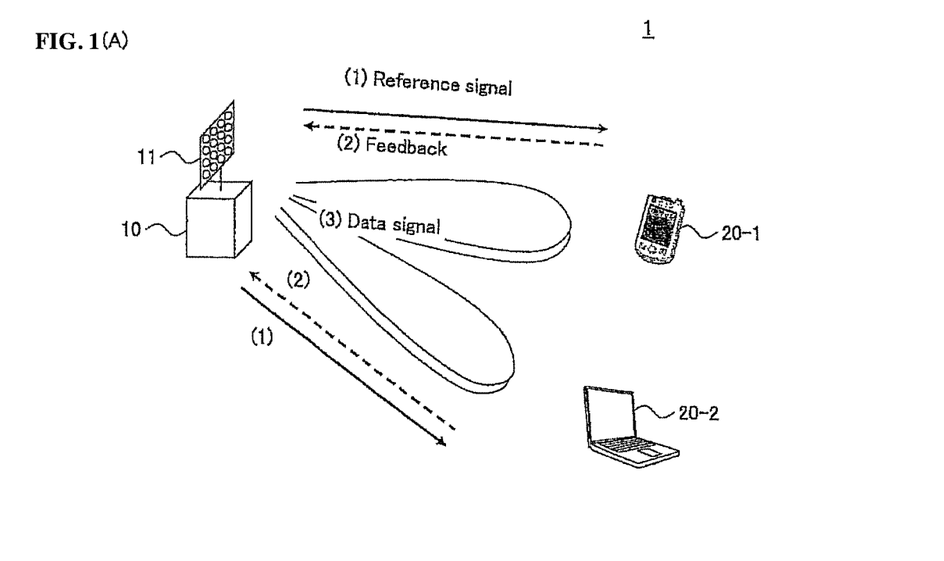
FIGS. 1(A) and 1(B) are schematic diagrams of a radio communication system according to the embodiment.
Figure 1B:
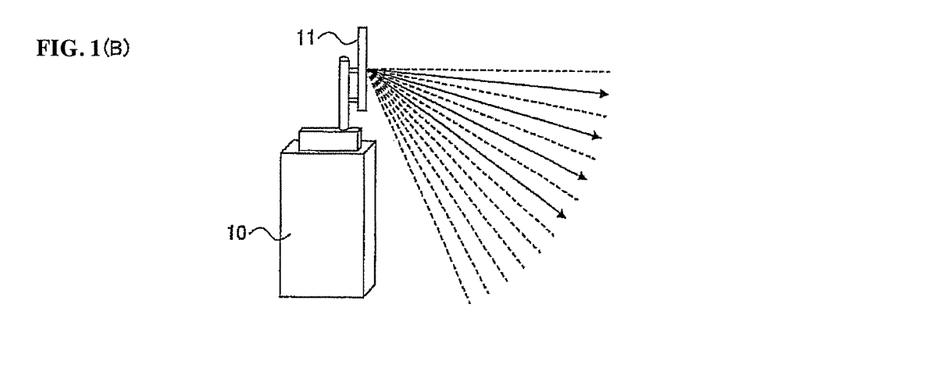

FIGS. 1(A) and 1(B) are schematic diagrams of a radio communication system 1 according to the embodiment. The radio communication system 1 includes a radio base station 10 and user equipment 20-1 and 20-2. In this example, multi-user MIMO (MU-MIMO) is employed to spatially multiplex multiple signals transmitted from the radio base station 10 to the user equipment 20-1 and 20-2.

The radio base station 10 has an antenna array 11 in which antennas are arranged two-dimensionally in rows and columns. The radio base station 10 uses a part or all of the antennas in the antenna array 11 when transmitting a reference signal (RS) as indicated by the arrow (1). The reference signal is received at the user equipment 20-1 and 20-2, respectively, and used for channel estimation. Detailed techniques of transmitting the reference signal from the antenna array 11 will be explained later.

Each of the user equipment 20-1 and 20-2 feeds back channel state information (CSI) estimated from the received reference signal to the radio base station 10 as indicated by the arrow (2).

The radio base station 10 creates transmission precoding weights for the user equipment 20-1 and 20-2 using the feedback information so as to suppress mutual interference between the user equipment 20-1 and 20-2. The radio base station 10 performs beamforming for transmitting data signals addressed to the user equipment 20-1 and 20-2 and the reference signal for channel estimation, and transmits the data signals as indicated by the arrow (3).

The precoding vectors, i.e., the beamforming weight vectors may be calculated at the radio base station 10 based upon the CSI fed back from the user equipment 20-1 and 20-2. The calculated precoding vectors may be reported to the user equipment 20-1 and 20-2. As an alternative, the user equipment 20-1 and 20-2 may calculate the precoding vectors, respectively, based upon the estimated channel information or channel matrixes. In this case, the estimated precoding vectors may be fed back to the radio base station 10. As another alternative, the radio base station 10 and the user equipment 20-1 and 20-2 may share a common codebook describing a set of precoding matrices. In this case, each of the user equipment 20-1 and 20-2 may select a desired precoding vector from the codebook based upon the estimated channel matrix.

As illustrated in the bottom part (B) of FIG. 1, the radio base station 10 with the two-dimensionally arranged antenna array 11 is able to perform vertical or elevation beamforming, in addition to horizontal or azimuth beamforming.

FIG. 2 illustrates several antenna configurations at the radio base station 10. In example (A), eight antennas are arranged in two rows and four columns. Each of the antenna #0 to antenna #7 may serve as an individual antenna element, or alternatively, two adjacent antennas (e.g., antenna #0 and antenna #1) allocated to mutually orthogonal polarizations may form one antenna element.

Figure 2A:
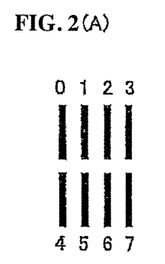
FIGS. 2(A), 2(B), 2(C), and 2(D) are diagrams explaining the relationship between two-dimensionally arranged antenna elements.
Figure 2B:
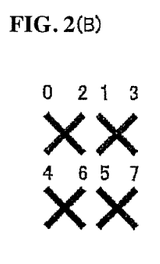
Figure 2C:
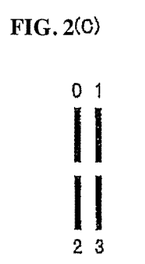
Figure 2D:
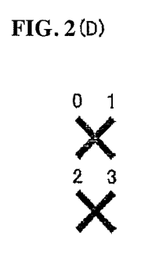

In example (B), four antenna elements are arranged in a matrix, each antenna element including two antennas corresponding to orthogonal polarizations. In example (C), four antennas are arranged in a matrix. In example (D), two antenna elements are arranged in the vertical direction, each of the antenna elements including two antennas corresponding to orthogonal polarizations.

When performing vertical or elevation beamforming using the two-dimensionally arranged antenna array 11, vertical-direction channel information is necessary, in addition to channel information in the horizontal direction and channel information between polarizations. The higher the number of antennas used for RS transmission, the more serious is the problem of overhead of the reference signal transmission from the radio base station 10.

One method for reducing transmission overhead is that the radio base station 10 reduces the number of antenna ports used for transmitting reference signals, compared with the actual number of antenna ports, when transmitting the reference signals. It is unnecessary to know all the relationships between antennas of the two-dimensional array when carrying out beamforming; rather, only a limited number of the antennas is needed. Important factors in the inter-antenna relationship are channel information in the horizontal direction, channel information in the vertical direction, and channel information between polarizations. Channel information includes, for example, absolute or relative values of the amount of phase rotation, variation in amplitude, or other parameters.

For example, with the antenna arrangement of example (B) of FIG. 2, high-value antenna combinations are {0, 1}, {2, 3}, {4, 5}, and {6, 7} in the horizontal relationship; {0, 4}, {1, 5}, {2, 6}, and {3, 7} in the vertical relationship; and {0, 2}, {1, 3}, {4, 6}, and {5, 7} in the inter-polarization relationship. Other antenna combinations are not so important. Accordingly, in the embodiment, reference signals are transmitted using a part of the antenna groups (combinations) of the two-dimensional antenna array.

Although FIG. 2 illustrates examples of antenna configurations with eight or less antennas, the same applies to the case using more than 8 antennas. In FD-MIMO, a number of antennas (greater than 8) are used to form a sharp beam for data transmission, thereby improving the frequency gain. In contrast, for transmission of reference signals, only high-value antenna combinations may be used to reduce overhead.

FIG. 3 illustrates examples of selection of antennas for transmission of reference signals. In examples (A) through (C) of FIG. 3, a part of antennas of the 4×4 antenna array is used for transmission of reference signals. In example (A), the antennas #0, #1, #2, and #3 positioned at the center of the antenna array are used. Assuming that the antenna #0 is the reference antenna, then a phase difference or an amplitude difference in channels between horizontally adjacent antennas can be estimated between antenna #0 and antenna #1. A phase difference or an amplitude difference in channels between vertically adjacent antennas can be estimated between antenna #0 and antenna #2. A phase difference or an amplitude difference in channels between the reference antenna #0 and other antennas positioned outside the antennas #0 through #3 can be estimated by extrapolation.

In example (B) of FIG. 3, antennas #0, #1, #2 and #3 positioned at the corners of the antenna array are used for transmission of reference signals. Between the reference antenna #0 and antenna #1 positioned at the horizontal corner with respect to the reference antenna #0, a phase difference or an amplitude difference in channels exists between horizontally arranged antennas. Between the reference antenna #0 and antenna #2 positioned at the vertical corner with respect to the reference antenna #0, a phase difference or an amplitude difference of channels exists between vertically arranged antennas. A phase difference or an amplitude difference in channels between the reference antenna #0 and other antennas positioned inside the antennas #0 through #3 can be estimated by interpolation.

In example (C) of FIG. 3, a row (or a horizontal line) and a column (or a vertical line) of the antenna array are selected. The antenna #0 positioned at the intersection between the selected row and column is the reference antenna. A phase difference or an amplitude difference in channels between horizontally arranged antennas can be estimated from the mutual relationship between the antennas #1, #0, #2 and #3 of the selected row. A phase difference or an amplitude difference in channels between vertically arranged antennas can be estimated from the mutual relationship between the antennas #4, #0, #5 and #6 of the selected column.

In example (D) of FIG. 3, eight antennas are arranged, which antennas form 4 polarization antenna elements. With antenna #0 as the reference antenna, a phase difference (or an amplitude difference) in channels between horizontally arranged antennas can be estimated between the reference antenna #0 and antenna #1. A phase difference or an amplitude difference between polarizations can be estimated between the reference antenna #0 and antenna #2. A phase difference (or an amplitude difference) in channels between vertically arranged antennas can be estimated between the reference antenna #0 and antenna #3.

Figure 3A:
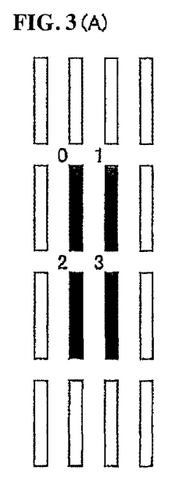
FIGS. 3(A), 3(B), 3(C), and 3(D) illustrate examples of selection of antenna elements for RS transmission.
Figure 3B:
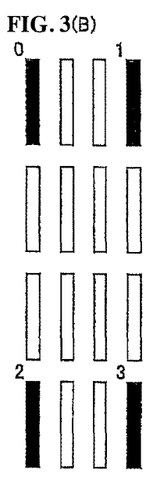
Figure 3C:
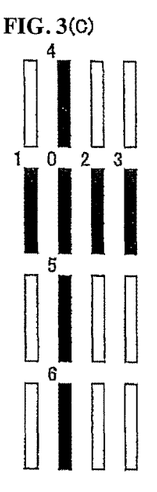
Figure 3D:
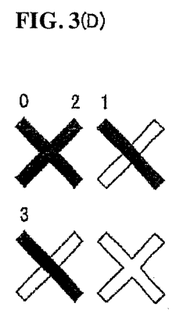

The radio base station 10 transmits a reference signal using only a part of the antennas, thereby reducing downlink resource consumption. The user equipment 20-1 and 20-2 report channel information relative to the reference antenna #0 to the radio base station 10, thereby reducing the feedback overhead. The reference antenna #0 may be determined in advance by selecting a suitable antenna. As an alternative, the reference antenna #0 may be configured semi-statically with a higher layer.

There is no limitation to the types of reference signals to be transmitted. A channel status information reference signal (CSI-RS), a cell-specific reference signal (CRS), a demodulation reference signal (DRS), or a newly provided reference signal may be transmitted as the reference signal.

Figure 4:
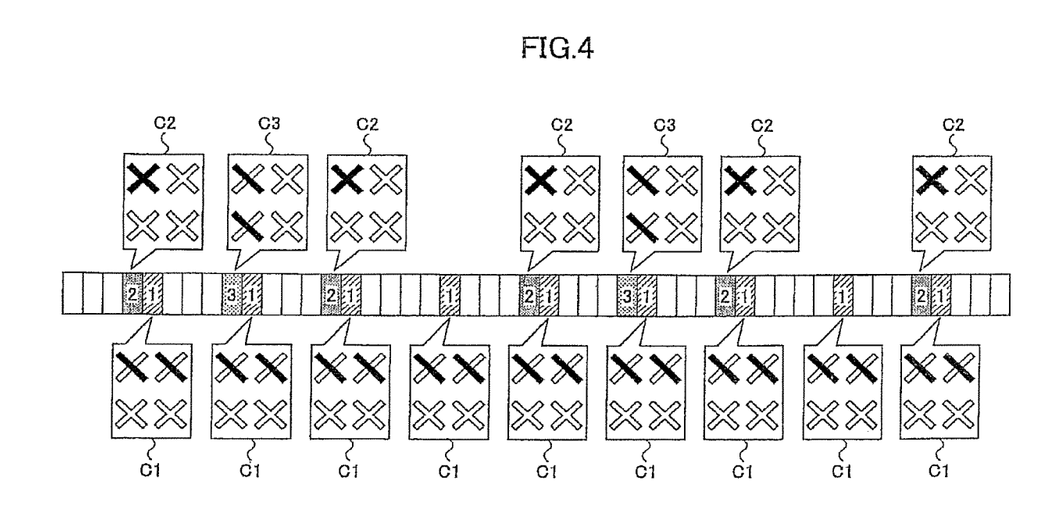
FIG. 4 illustrates an example of transmission of reference signals.

FIG. 4 through FIG. 7 illustrate examples of transmission of reference signals. In the example of FIG. 4, horizontal channel estimation, vertical channel estimation, and inter-polarization channel estimation are performed using two or more RS sequences. CSI-RS configuration information supplied from an higher layer may be used to perform horizontal, vertical, and inter-polarization channel estimations.

For horizontal channel estimation, a reference signal is transmitted in horizontal configuration C1. For inter-polarization channel estimation, a reference signal is transmitted in polarization configuration C2. For vertical channel estimation, a reference signal is transmitted in vertical configuration C3.

In view of the conditions in a cell, channel fluctuation in the vertical direction is generally slow and gentle, compared with that in the horizontal direction. Therefore, the resource allocation rate for RS transmission with the horizontal configuration C1 is set the greatest. The resource allocation rate for RS transmission with the polarization configuration C2 is set the second greatest. The resource allocation rate for RS transmission with the vertical configuration C3 is set smaller than other configurations (C1 and C2 in this example).

The configuration group {C1, C2, C3} used for the RS transmission may be instructed to be used by the higher layer. Although three configurations are used in FIG. 4, the invention is not limited to these examples and only two configurations may be used. For example, a combination of antennas #0, #1, and #2 of pattern (D) of FIG. 3 may be used as the first configuration C1, which configuration may be named "horizontal-and-polarization configuration". The vertical configuration C3 of FIG. 4 may be used as the second configuration.

The user equipment 20-1 and 20-2 that received the referenced signal in two or more configurations may employ different feedback schemes corresponding to different configurations. For example, a horizontal channel estimate value and an inter-polarization channel estimate value (or precoding vectors selected based upon these channel estimate values) may be reported as feedback information to the radio base station 10 by means of LTE 4 Tx codebooks. A vertical channel estimate value or the precoding vector selected based upon the channel estimate value may be fed back to the radio base station 10 by another codebook or a precoded reference signal index (such as precoded CSI-RS index). The radio base station 10 may designate and report the feedback scheme to be used to the user equipment 20-1 and 20-2.

When transmitting a reference signal in two or more configurations, the radio base station 10 may dynamically change over antenna groups used for multiplexing the reference signal.

Figure 5:
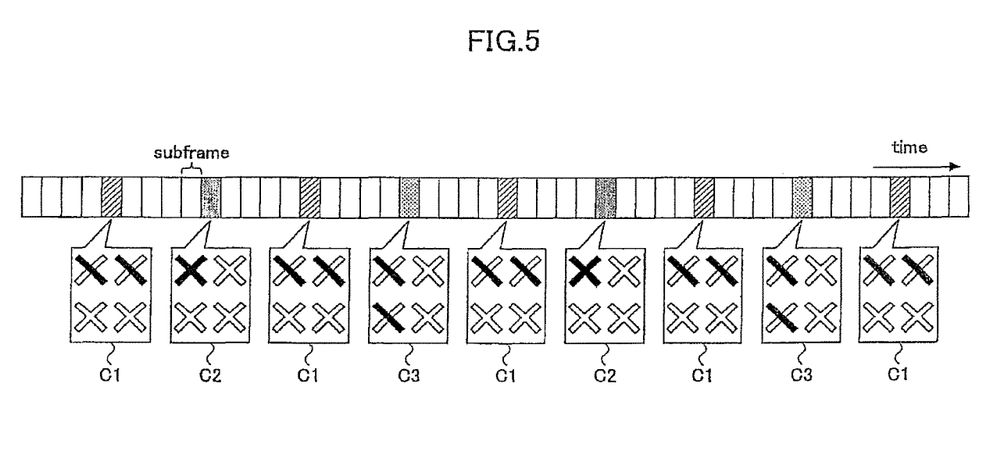
FIG. 5 illustrates another example of transmission of reference signals.
Figure 6:
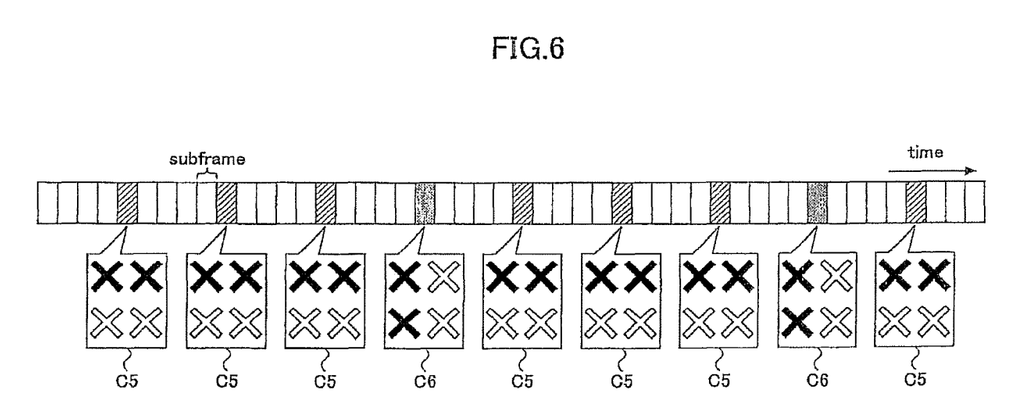
FIG. 6 illustrates still another example of transmission of reference signals.

FIG. 5 and FIG. 6 illustrate examples of changing over antennas to which CSI-RS is mapped along the time axis. In the previous example of FIG. 4, RS transmission overhead is reduced by transmitting reference signals in two or more RS configurations using a part of antenna elements. The overhead may also be reduced by dynamically changing over antenna elements to which the reference signal is multiplexed. In FIG. 5, a CIS-RS is transmitted every 10 milliseconds in horizontal configuration C1, and transmitted every 20 milliseconds in polarization configuration C2 and in vertical configuration C3.

The configuration to be used and the transmission period may be reported from the radio base station 10 to the user equipment 20-1 and 20-2. The user equipment 20-1 and 20-2 may carry out independent feedback operations for the respective configurations.

FIG. 6 illustrates another example of changeover of RS configurations. In FIG. 6, a reference signal is transmitted every 5 milliseconds in horizontal-and-polarization configuration C5, and this configuration C5 is overridden by another configuration C6 every 20 milliseconds. The reference signal transmitted in configuration C6 is used vertical channel estimation and inter-polarization channel estimation. The overriding period (20 milliseconds in this example) may be reported from the radio base station 10 to the user equipment 20-1 and 20-2.

When two or more configurations come into collision, several countermeasures may be taken.

(1) More frequent RS (transmitted in configuration C5 in this example) is overridden or prioritized over by less frequency RS (transmitted in configuration C6 in this example).

(2) Configuration indexes are determined in advance, and the transmission priority is determined according to the indexes.

(3) Priority order is reported.

Although in FIG. 6 the reference signal is transmitted every 20 milliseconds in configuration C6 for vertical and inter-polarization channel estimations, the invention is not limited to this example. Another configuration for horizontal, vertical, and inter-polarization channel estimations may be used in place of C6. In this case, the horizontal channel estimate value and the inter-polarization channel estimate value may be fed back by an LTE 4 Tx codebook, and the horizontal, vertical, and inter-polarization channel estimate values may be fed back by an LTE 8 Tx codebook.

Although changeover of RS transmission configurations in time is illustrated in FIG. 5 and FIG. 6, the invention is not limited to these examples. Reference signals may be multiplexed in different configurations along the frequency axis. Multiplexing granularity may be selected arbitrarily, for example, on the sub-band basis, sub-carrier basis, or other frequency basis.

Next, a novel feedback method that enables reducing overhead is explained.

Figure 7A:
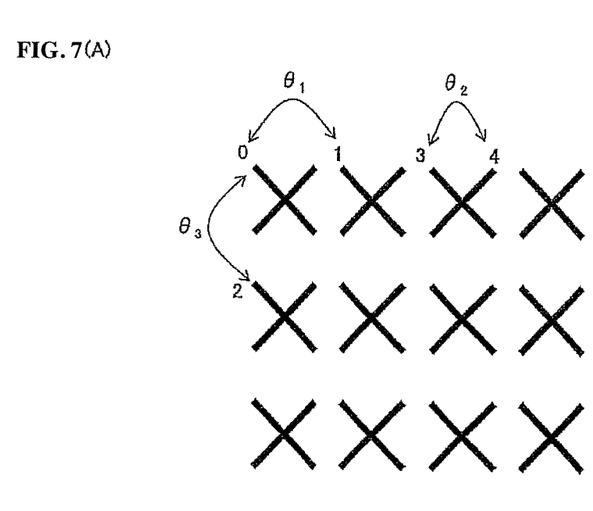
FIGS. 7(A) and 7(B) illustrate an information feedback technique from user equipment to a base station.

FIG. 7 is a diagram explaining the feedback method according to the embodiment. In the example of top part (A) of FIG. 7, 24 antenna ports, each antenna port corresponding to one antenna, are arranged two-dimensionally. The phase rotation of channels between horizontally adjacent antenna #0 and antenna #1 is θ1. The phase rotation of channels between antenna #3 and antenna #4 serving as polarization elements is θ2. The phase rotation of channels between vertically adjacent antenna #0 and antenna #2 is θ3.

Figure 7B:
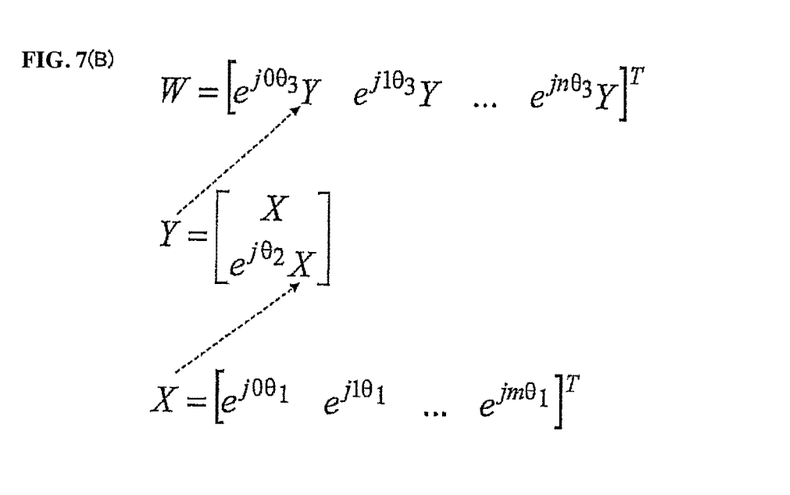

As illustrated in bottom part (B) of FIG. 7, channel information in the vertical direction is incorporated in the precoding vector W which is to be fed back to the radio base station 10.

First, matrix X including phase rotation (or a phase difference) θ1 between horizontally adjacent antennas is created by formula (1).

$$X = [e^{j0\theta_1}\ e^{j1\theta_1} \ldots e^{jm\theta_1}]^T \quad (1)$$

where m denotes the number of antennas in the horizontal direction, and T denote transposed matrix.

Then, matrix Y including phase rotation (or a phase difference) θ2 between polarizations is created by formula (2).

$$Y = \begin{bmatrix} X \\ e^{j\theta_2} X \end{bmatrix} \quad (2)$$

The previously created matrix X representing the channel information in the horizontal direction is incorporated in this matrix Y.

Then, matrix W containing a phase rotation (or a phase difference) θ3 between vertically adjacent antennas is created by formula (3).

$$W = [e^{j0\theta_3}Y\ e^{j1\theta_3}Y \ldots e^{jn\theta_3}Y]^T \quad (3)$$

where n denotes the number of antennas in the vertical direction, and T denotes transposed matrix. This matrix W incorporates the matrix Y in which matrix X has been incorporated.

By simply transmitting the matrix W to the radio base station 10, channel information between horizontally adjacent antennas, channel information between polarization, and channel information between vertically adjacent antennas can be fed back to the radio base station 10. Consequently, overhead of feedback information can be efficiently reduced.

The creation of the feedback information exemplified in FIG. 7 is for rank-1 transmission. By using a matrix orthogonal to the matrix W, the feedback information creation scheme can be extended to rank-2 or higher-rank transmission. In place of the relative value θ of phase rotation, other values may be used as the channel information. For example, an absolute value of phase rotation, a relative or absolute value of amplitude fluctuation, or a long-period or short-period fluctuation characteristic may be used as the channel information.

In place of the scheme illustrated in FIG. 7, the existing 2D-MIMO codebooks may be extended to 3D-MIMO. In this case, the extended vector W is expressed by formula (4).

$$W = [e^{j0\theta_3}X\ e^{j1\theta_3}X \ldots e^{jn\theta_3}X] \quad (4)$$

where n denotes the number of antennas in the vertical direction, θ3 denotes a phase rotation (or phase difference) between vertically adjacent antennas, and X denotes a codebook achieving 2D-MIMO. As the codebook for achieving 2D-MIMO, existing 2 Tx codebooks, 4 Tx codebooks, 8 Tx codebooks, codebooks discussed in LTE Release 12 DL-MIMO, or codebooks used in uplink transmission may be used.

Although Formula (4) is for rank-1 transmission, it can be extended to rank-2 or higher-rank transmission by using a matrix orthogonal to the matrix W.

As still another scheme, existing 2D-MIMO codebooks may be used as they are. Since 2D-MIMO codebooks are not designed for including three factors, namely, horizontal channel information, vertical channel information, and inter-polarization channel information, the accuracy may be slightly degraded. However, using 2D-MIMO codebooks is still an effective method because the channel fluctuation in the vertical direction is gentle and because there is little impact on the exiting specification.

It is assumed that time selectivity and frequency selectivity vary among the horizontal direction, the vertical direction, and inter-polarization. Accordingly, temporal feedback frequency and/or transmission bandwidth of feedback information may be appropriately selected.

For example, in view of the facts that elevation beamforming undergoes less channel fluctuation and that the beam pattern is unlikely to be changed frequency because of less necessity for avoiding inter-cell interference, feedback may be carried out less frequently and at a broadband to reduce overhead.

Feedback may be carried out dynamically at a lower layer or semi-statically at a higher layer, or alternatively, dynamic feedback at a lower layer and semi-static feedback at a higher layer may be combined. The number of bits for feedback information in the horizontal direction, the vertical direction, and inter-polarization may be the same or different from one another.

The values of phase rotation (or phase difference) in the horizontal direction, the vertical direction, and inter-polarization may not be always acceptable. Especially, the phase rotation θ3 in the vertical direction physically corresponds to a tilt angle, as illustrated in the bottom part (B) of FIG. 1. It may be effective to limit the selectable range of the θ3 value. Several candidates for θ3 may be set at each radio base station 10. The candidate values may be reported by a higher layer, and an appropriate value may be selected dynamically at a lower layer for changing over the value.

Figure 8:
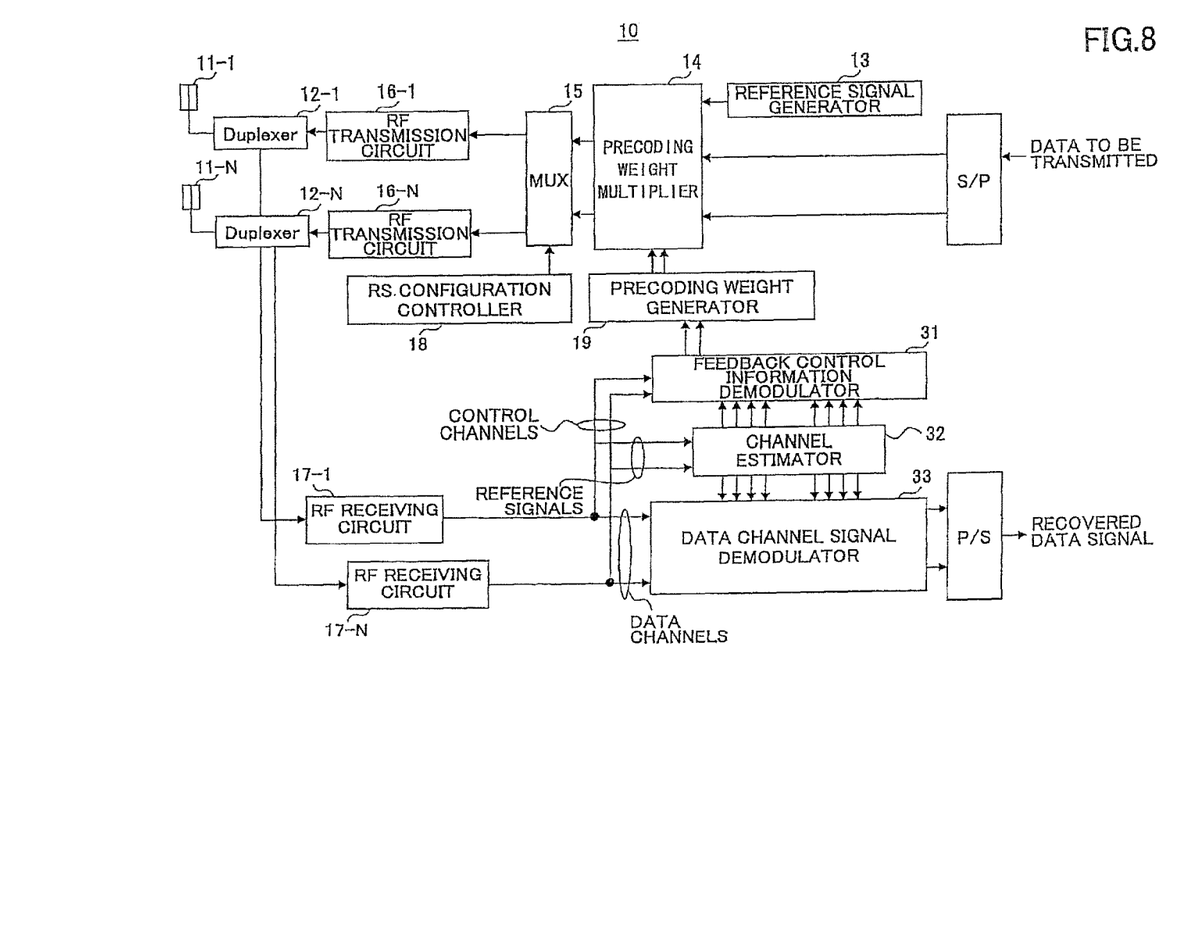
FIG. 8 is an exemplified block diagram of a radio base station.

FIG. 8 is a schematic diagram of the radio base station 10 used in the radio communication system 1 of FIG. 1. The radio base station 10 has multiple antennas 11-1 to 11-N. Radio frequency (RF) transmission circuits 16-1 to 16-N and RF receiving circuits 17-1 to 17-N are provided according to the number of antennas 21-1 to 21-N.

A reference signal generator 13 generates a reference signal used for channel estimation. A precoding weight generator 19 generates a precoding weight vector based upon received feedback information supplied via the RF receiving circuits 17-1 through 17-N. A precoding weight multiplier 14 performs precoding on the reference signal and data signal using the generated precoding weight vector. The data signal input to the precoding weight multiplier 14 has been subjected to serial-to-parallel conversion, channel coding, and modulation. Since these operations are not directly related to the invention, processing blocks are omitted in the figure.

A multiplexer (MUX) 15 multiplexes the precoded reference signal and data signal. An RS configuration controller 18 controls selection and changeover of configurations of reference signal (RS) transmission. The RS configuration controller 18 controls allocation of resources to different RS configurations, as illustrated in FIG. 4. Alternatively, the RS configuration controller 18 controls transmission timings or overriding timings of RF configurations, as illustrated in FIG. 5 or FIG. 6. Under such control, the reference signal is multiplexed to a sequence corresponding the RS configuration to be used. The multiplexed signal is transmitted via the RF transmission circuits 16-1 through 16-N and duplexers 12-1 through 12-N.

A feedback signal from user equipment 20 is received at antennas 11-1 through 11-n, and supplied via the duplexers 12-1 through 12-N and the RF receiving circuits 17-1 through 17-N to a feedback control information demodulator 31. Demodulation results are supplied from the feedback control information demodulator 31 to the precoding weight generator 19, and a precoding weight vector is generated according to the feedback information. Channel estimation (performed by a channel estimator 32) based upon the reference signal, demodulation of data signal (performed by a data channel signal demodulator 33), or decoding operations are not directly related to the invention, and explanation is omitted.

Figure 9:
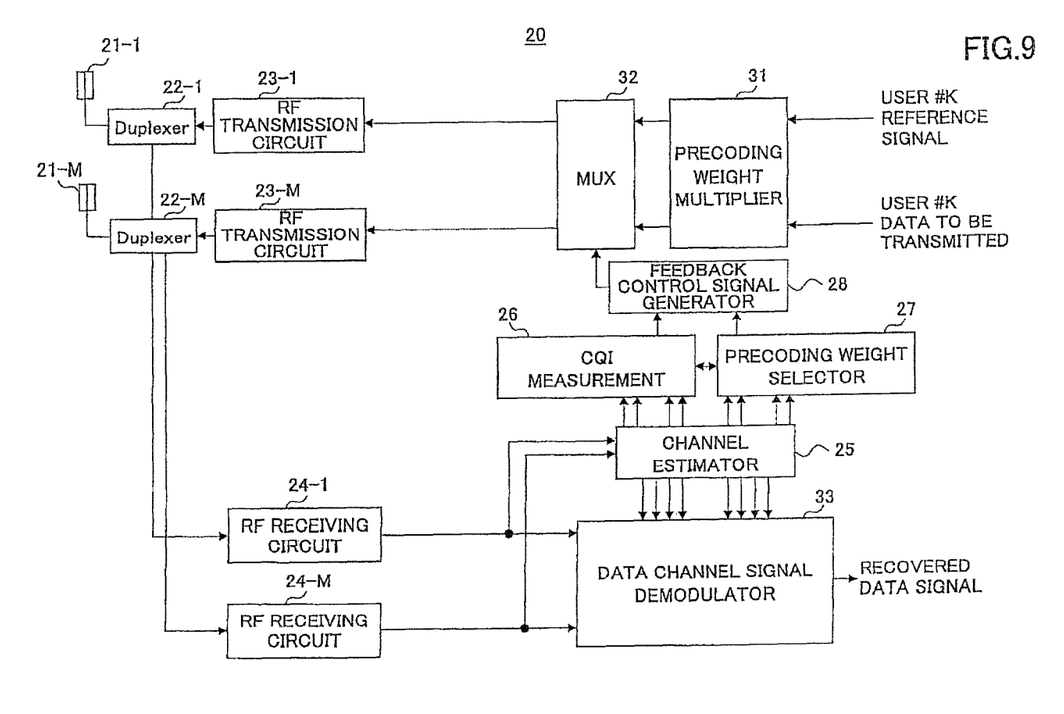
FIG. 9 is an exemplified block diagram of user equipment.

FIG. 9 is a schematic block diagram of user equipment 20. The user equipment 20 receives the reference signal transmitted from the radio base station 10 at RF receiving circuits 24-1 to 24-M through antennas 21-1 to 21-M and duplexers 22-1 to 22-M. A channel estimator 25 estimates a channel based upon the received reference signal. A precoding weight selector 27 selects a precoding weight vector according to the channel estimation value. A channel quality (CQI) measurement unit 26 measures a channel quality based upon the received reference signal.

The channel quality measurement result and the selection result of the precoding weight vector are supplied to a feedback control signal generator 28. The feedback control signal generator 28 generates a feedback signal to be reported to the radio base station 10. The feedback signal may include a precoding matrix W expressed by formula (3), containing channel information of the horizontal direction, the vertical direction, and inter-polarization. The feedback signal may also include a precoding matrix W expressed by formula (4), extending an existing 2D-MIMO codebook in the vertical direction. Alternatively, the feedback signal may include an existing 2D-MIMO codebook.

A user reference signal and a user data signal are precoded at a precoding weight multiplier 31, and supplied to a multiplexer (MUX) 32. The multiplexer 32 multiplexes the precoded user reference signal and user data signal to form the generated feedback signal. The multiplexed signal is transmitted from antennas 21-1 to 21-M, via the RF transmission circuits 23-1 to 23-M and duplexers 22-1 to 22-M.

With the above-described method and structure, transmission overhead of channel-estimation reference signals can be reduced in a 3D-MIMO radio communication system employing elevation beamforming. Transmission overhead is also reduced in feedback of channel characteristics.

Although in the embodiment explanation is made of downlink 3D-MIMO transmission, the invention is also applicable to uplink transmission. If a mobile terminal (user equipment) has a two-dimensional antenna array, the above-described reference signal configurations or the feedback schemes can be applied. Especially in a time division duplexing (TDD) system, three-dimensional channel estimation can be performed based upon the receiving results of the downlink reference signal, and uplink beamforming making use of uplink-downlink duality.

Regarding phase rotation, discrete Fourier transform (DFT) codebooks on the assumption of correlation antennas, or Householder codebooks on the assumption of uncorrelated antennas may be used.

What is claimed is:

1. A user equipment comprising:
   a receiver configured to receive candidates of phase rotation in a horizontal direction and candidates of phase rotation in a vertical direction for precoding; and
   a processor configured to report feedback information including a phase rotation in the horizontal direction and a phase rotation in the vertical direction for precoding to a radio base station based upon the candidates of the phase rotation in a horizontal direction and the candidates of phase rotation in a vertical direction for precoding,
   wherein the candidates of phase rotation in the horizontal direction or the candidates of phase rotation in the vertical direction for precoding are a part of predetermined candidates, the part being selected from the predetermined candidates according to a predetermined method, and
   wherein the candidates of phase rotation in the horizontal direction and the candidates of phase rotation in the vertical direction have limited values of phase rotation which set one or more values that correspond to candidates obtained by extracting every nth candidate of phase rotation in the vertical direction at the radio base station.

* * * * *